2 Sheets—Sheet 1
I. A. JOHNSON.
HARVESTER RAKE.
No. 109,415. Patented Nov. 22, 1870.
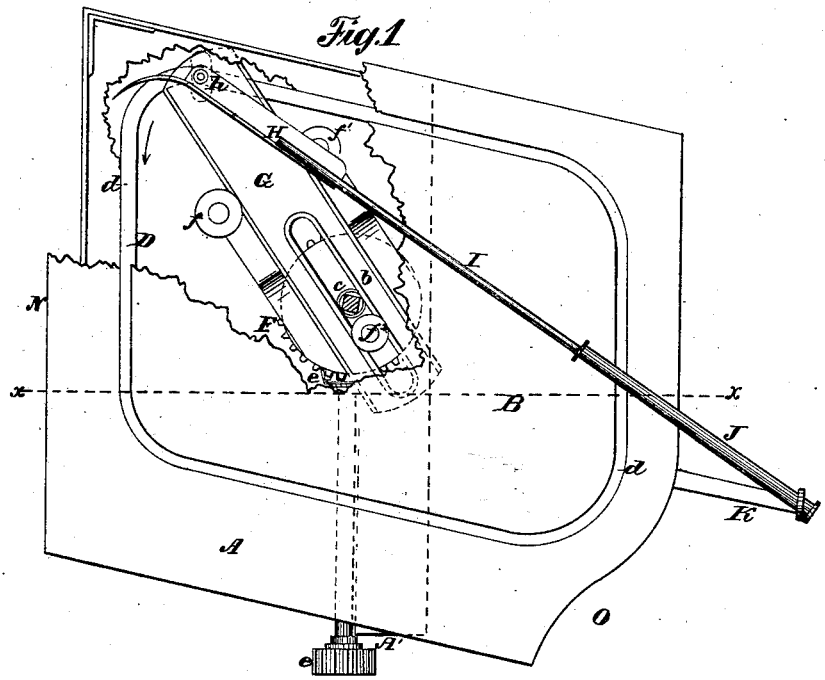
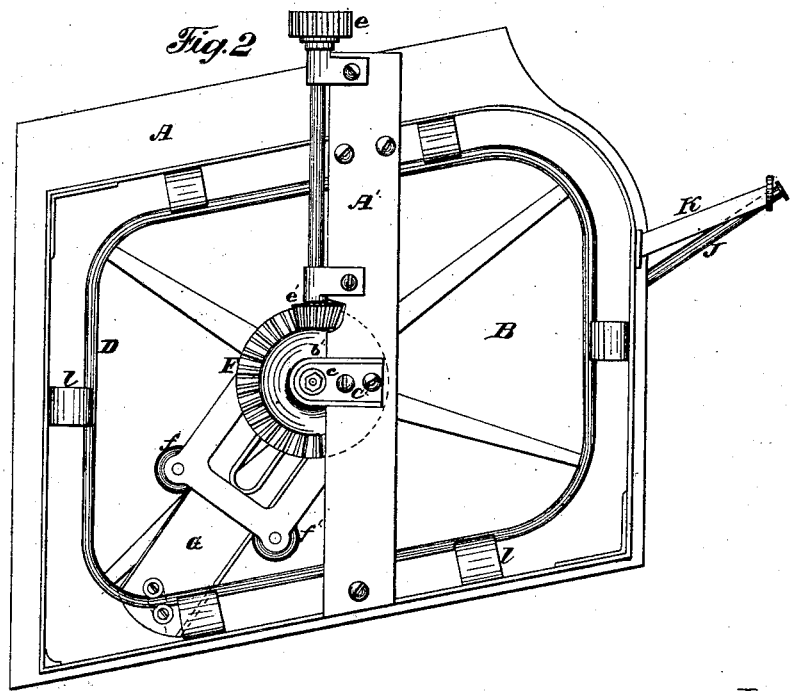
Witnesses:
Inventor:

2 Sheets—Sheet 2.
I. A. JOHNSON.
HARVESTER RAKE.
No. 109,415. Patented Nov. 22, 1870.
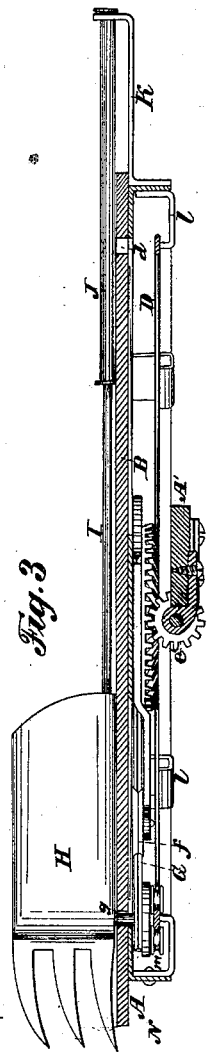
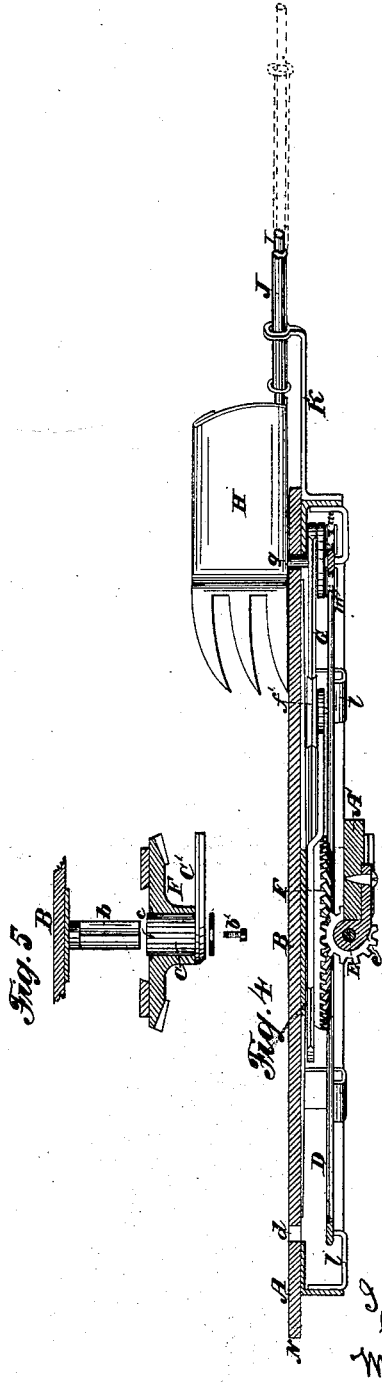
Witnesses:
Inventor:

UNITED STATES PATENT OFFICE.

ISAAC A. JOHNSON, OF ROCKFORD, ILLINOIS, ASSIGNOR TO HIMSELF AND FREDERICK H. MANNY, OF SAME PLACE.

IMPROVEMENT IN HARVESTER-RAKES.

Specification forming part of Letters Patent No. 109,415, dated November 22, 1870.

*To all whom it may concern:*

Be it known that I, ISAAC A. JOHNSON, of Rockford, in the county of Winnebago and State of Illinois, have invented certain new useful Improvements in Harvester-Rakes, of which the following is a specification:

My invention relates to that class of automatic rakes for harvesters in which the rake moves in a path corresponding with the contour of the platform by means of an extensible arm and a guide-slot in the platform.

The object of the first part of my invention is to secure a firm support for the inner platform, an unobstructed space below the platform for the working of the mechanism which drives the rake, and means whereby the inner platform may readily be removed or replaced to facilitate access to the gearing, all of which I accomplish by mounting the platform upon a polygonal stud inserted into a socket in a spindle, around which the rake-driving mechanism revolves. This spindle is secured upon a bracket projecting from a cross-beam of the frame. A screw passes through this bracket into the stud, and thus holds the platform firmly, while leaving room for the rake-driving mechanism freely to traverse below the platform, which can at any time be removed by releasing the screw, and thus afford access to the mechanism beneath it. I have found it impracticable to secure these desiderata by keying the platform to a round stud.

The next part of my invention relates to the rake-driving mechanism, and its object is to afford a firm lateral support to the slide-bar which carries the rake, while permitting said slide-bar freely to move toward or from its axis of rotation, to conform the movements of the rake to the contour of the platform. This I do by mounting friction-rollers on the gear-wheel which drives the rake and arranging a longitudinally-slotted slide-bar to move endwise in these friction-rollers.

The next part of my invention relates to the rake-guiding mechanism, and its object is to control the movements of the rake positively, and thus avoid friction on the slot in the platform through which the pin that drives the rake passes. This I do by combining with the slide-bar a guide-rail beneath the platform of a form counterpart of that of the path to be described by the rake.

The next part of the invention relates to the means for maintaining the rake-teeth in proper relation to the grain, and this I do by attaching the rake-head to a rod sliding freely endwise in a tubular socket, which in turn slides and also oscillates freely in a bearing in a bracket mounted on the rear end of the main frame, near the gearing side of the machine, instead of being on the grain side, as usual. I thus secure a compact arrangement of the joints of the rake-arm.

My improvement further consists in combining a rotating slide-bar and a fixed guide below the platform with the rake and its telescopic slide-joints above the platform.

In the accompanying drawing, which shows so much of a harvester as is necessary to illustrate my invention, Figure 1 is a plan or top view, with a portion of the platform broken away to show the mechanism of the rake. Fig. 2 is a plan view of the under side of the machine; Fig. 3, a vertical diagonal section at the line $x\,x$ of Fig. 1, with the rake just beginning to sweep the grain from the platform; Fig. 4, a similar section with the rake retracted; Fig. 5, sections through the center of the platform-supports.

The platform A is firmly connected with the main or gearing frame in any proper manner. A beam, A', extends across beneath this platform, to which it is firmly secured. The central portion, B, of the platform is supported entirely upon a polygnal stud, $b$, Fig. 5, which fits into a corresponding socket, $c$, in a spindle, C, mounted on a bracket, C', supported upon the cross-beam A' underneath the frame. A screw, $b'$, passes through the bracket into the stud $b$, and thus secures the platform firmly in place. A groove, $d$, is left between the two platforms A B, in which groove a stud on the rake traverses, as hereinafter explained. A spur-pinion, $e$, on a shaft, E, is driven from the driving-wheel by suitable mechanism. A bevel-pinion, $e'$, on the shaft E drives a bevel-wheel, $f$, which turns freely on the spindle C, and carries friction-rollers $f f^1 f^2$, the rollers $f f^1$ being mounted on a frame projecting from said wheel. A slotted bar or plate, G, slides freely endwise between these rollers. A pin, g, on this bar extends upward through the slot d in the platform. A rake-head, H, is pivoted on this pin by means of a socket, h, Fig. 1. The arm or stale I of this rake slides freely endwise in a tubular rod, J, which, in turn, moves freely endwise in a bearing in a bracket, K, and also oscillates freely therein. This bracket is, by preference, located on the gearing side of the platform, instead of on the grain side, as is usual with rakes of this class. A guide-rail, D, is supported on brackets l under the slot d in the platform, and is embraced by friction-rollers m on the sliding arm G. This rail is of a form the counterpart of the slot d, and also of the path to be described by the rake, and thus avoids friction against the sides of the slot.

The operation of my improved rake is as follows: In Figs. 1 and 2 the parts are shown in the position they assume when the rake is just beginning to traverse the platform from the grain to the gearing side to discharge the gavel. The grain, as it is cut, falls upon the front edge, N, of the platform, whence it is swept against a grain board or fender on the gearing side of the platform, as usual with this class of rakes, and then swept back and discharged from the platform at the point O. The rake conforms its movements to the shape of the guide D and slot d in the platform. In Figs. 1, 2, and 3 the rake is shown as extended—that is, at its farthest point from the bracket K—while in Fig. 4 it is shown as retracted at its closest point of approximation to the bracket. The two sliding rods I J allow the greatest freedom of movement to the rake, and their arrangement is more compact than the single sliding stales or the jointed arms heretofore employed.

My mode of securing the inner platform is advantageous, as it leaves an unobstructed space for the working of the rake, and the platform can easily be removed or replaced. The guide-rail and slide-bar afford a convenient means of controlling the movements of the rake.

I am aware that a rake of this class has been driven by an extensible arm, and also that a platform has heretofore been supported from its center only, and do not therefore broadly claim these devices.

I claim as my invention—

1. The combination of the inner platform, the polygonal stud secured to the under side of the platform, the polygonal socket in the spindle, through which the stud passes, and around which the rake-driving mechanism revolves, and the bracket upon which the spindle is mounted, the parts being constructed as set forth, to secure a firm support for the platform, an unobstructed space for the working of the rake, and a ready removal or replacement of the platform.

2. The combination of the bevel-wheel, the friction-rollers carried by said wheel, the slotted slide-bar moving endwise on the friction-rollers, and the rake-head pivoted to said slide-bar, these parts being constructed and operating as set forth.

3. The combination of the guide-rail and rotating slide-bar, both arranged beneath the platform, and the rake working over the platform and in a slot therein, all these parts being constructed to operate in combination, substantially as hereinbefore set forth.

4. The combination, with the rake, of the oscillating endwise-moving telescopic slide-rods, constructed and operating as set forth.

5. The combination of the guide-rail and slide-bar below the platform with the rake and its telescopic slide-joints above the platform, as set forth.

In testimony whereof I have hereunto subscribed my name.

ISAAC A. JOHNSON.

Witnesses:
CYRUS F. MILLER,
GEO. F. JOHNSON.